United States Patent [19]
Larsen et al.

[11] 4,148,005
[45] Apr. 3, 1979

[54] THERMOMETRIC TRANSDUCER DEVICE

[75] Inventors: Lawrence E. Larsen, Silver Spring; John H. Jacobi, Bowie, both of Md.

[73] Assignee: United States of America as represented by the Secretary of the Army, Washington, D.C.

[21] Appl. No.: 842,138

[22] Filed: Oct. 14, 1977

[51] Int. Cl.$^2$ .............................................. H01C 7/04
[52] U.S. Cl. ...................................... 338/28; 128/2 H
[58] Field of Search ............ 338/25, 28, 22 R, 22 SD; 73/362 AR; 128/2 H; 324/58 B; 333/84 M

[56] References Cited

U.S. PATENT DOCUMENTS 3,893,058   7/1975   Keith ...................................... 338/28

OTHER PUBLICATIONS

L. Larsen, et al., *A Microwave Decoupled Brain-Temperature Transducer*, "IEEE Transactions On Microwave Theory and Techniques", vol. MTT-22, No. 4, pp. 438-444, Apr. 1974.

Robinson, et al., *Microwave Heating of Malignant Mouse Tumors and Tissue Equivalent Phantom Systems*, "Journal of Microwave Power", vol. 11, No. 2, pp. 87-98, Jun. 1976.

G. R. Davis, *Microwaves Score TKO in Fight Against Cancer*, "Microwaves", vol. 15, No. 10, pp. 14, 16, Oct., 1976.

R. P. Clark, et al., *An Application of Aeronautical Techniques to Physiology: 1 The Human... Convection Heat Transfer*, "Medical and Biological Engineering", vol. 12, No. 3, pp. 270-274, May 1974.

*Primary Examiner*—C. L. Albritton
*Attorney, Agent, or Firm*—William G. Gapcynski; Werten F. W. Bellamy

[57] ABSTRACT

A thermometric transducer device is provided for use in measuring the temperature of a dielectric, such as human tissue, during exposure of the dielectric to microwave radiation. The system includes a transducer electrode sub-assembly which is partially inserted into the dielectric and comprises a thermistor mounted on one end of an elongate substrate and thick film conductors which extend along the length of the substrate and which are tapered so as to provide electrothermal matching of the heat produced in an equivalent volume of the dielectric so that the transducer electrode serves neither as a heat source or a heat sink. The transducer sub-assembly is connected to measurement instrumentation by a transmission line formed by ultra-thin film conductors whose thickness relative to the skin depth of the microwave field in the conductors is such that the conductors are a poor medium for microwave conduction and are thus microwave decoupled.

12 Claims, 4 Drawing Figures

THERMOMETRIC TRANSDUCER DEVICE

FIELD OF THE INVENTION

The present invention relates to an improved thermometic system, operating in a microwave field, for measuring the temperature of a dielectric object exposed to the field and, in particular, for measuring the temperature of human tissue, e.g., brain tissue, exposed to microwave radiation.

BACKGROUND OF THE INVENTION

The heat produced when biological systems are exposed to microwave radiation can contain important information regarding the response of the biological systems to such radiation. For example, the measurement of brain temperature during moderate to high level exposure to microwave radiation is of considerable importance in studying microwave-induced central nervous system pathophysiology.

A discussion of brain temperature, and previous measurements, in vivo, of the microwave heating of brain tissue is contained in the article "A Microwave Decoupled Brain - Temperature Transducer", by Larsen et al, IEEE Transaction on Microwave Theory and Techniques, Vol. MTT-22, No. 4, April 1974. This article, which is co-authored by one of the inventors here, also describes a transducer system based on a hybrid microwave integrated circuit (MIC) construction used in making temperature measurements. In general, the MIC transducer comprises a thick film thermistor mounted on contact pads located at the distal end of a gold microline formed by conventional metallization and photolithographic techniques on a sapphire needle. Separate series resistors for suppression of dipole currents are also employed. Although the MIC transducer construction disclosed in the Larsen et al article provides advantages over prior art transducers used for the purposes in question, there are problems with the MIC transducer with respect to the effects of different temperature coefficients and excessive heating in the carbon loaded polytetraflouroethylene (PTFE) transmission line interposed between the transducer sub-assembly and the resistance measurement instrumentation.

More generally, it has been found that a serious problem associated with transducer probes or electrodes is that these electrodes tend to act either as a heat source or a heat sink and that the heat added to or substated from the tissue due to the electrode will distort the temperature measurement that is being made. To explain, where the transducer probe or electrode is more lossy than the tissue in the microwave environment, the electrode will act as a source of heat, and heat from the probe will be transferred to the tissue, thereby raising the temperature of the tissue and thus disturbing the measurement to be made. On the other hand, it also is possible for the electrode to act as a heat sink so that heat flows from the tissue whose temperature is to be measured, thereby lowering this temperature and distorting the results. Ideally, an electrode or probe would have a loss that matches the equivalent volume of the tissue displaced thereby. Strictly speaking, this is not possible due to the fact that the loss tangent of the tissue is not static. In fact, the microwave properties of the tissue constantly change due to such factors as regional blood flow and physiological responses to regional flow. However, as will become clear, a very important aspect of the present invention is to provide an electrode which, in general, acts neither as a heat source or as a heat sink.

One problem with the MIC transducer construction discussed above, as well with further developments thereof, concerns the heating provided by the overall transducer system and, in particular, by the PTFE transmission line. For example, it was necessary to steadily increase the resistance of the line in order to reduce heating and, for the required operation in air, this could only be achieved by reducing the carbon density. The result was that where the lineal resistance of the line was increased to on the order of 100 to 150 Kohms, serious problems were encountered in making reliable connections to the line. As a consequence, the junction impedance increased over time and the transducer probe or electrode acted more as a mechanical transducer than a temperature transducer. Another problem concerns the presence of standing waves on the line where the line was operated, in air, parallel to the polarization of the electric field. Further, experiments with the transducer sub-assembly without the transmission line demonstrated that heat sinking could become a problem if the line was to be adequately decoupled.

Finally, the thermal conductivity of the transducer electrode is another matter of importance where the electrode must traverse regions wherein temperature gradients exist. As pointed out in the Larsen et al article, there is a 0.5° C. gradient between the cortex of the brain and the brain stem due to circulatory patterns. Thus, an electrode which is suitable for use for purposes outlined above must have the lowest possible thermal conductivity as well as provide the best possible loss matching.

SUMMARY OF THE INVENTION

Generally speaking, the present invention concerns a thermometric transducer system for use in tissue during microwave exposure which provides electrothermal matching of the heat produced in an equivalent volume of the tissue by providing a varying impedance in the connecting line which varies between a relatively high value, for operation in air, and a relatively low value, for operation tissue. As a result, the transducer electrode does not distort the induced field (i.e., is microwave transparent) and there is no heat sourcing or heat sinking as is provided with prior art devices. In addition, the thermal conductivity of the transducer electrode is extremely low and thus the two prerequisites of a successful thermometric transducer device discussed above, i.e., good loss matching and low thermal conductivity, are met. Further, and more generally, the thermometric transducer device or system of the invention provides high stability and high accuracy and is of an extremely small size.

In accordance with a preferred embodiment, the transducer system of the invention includes a transducer electrode subassembly comprising an elongate substrate, a sensor means, mounted at one end of the substrate, for sensing the temperature of a dielectric object and for converting the temperature sensed into a corresponding electrical signal, and conductor means mounted on the substrate and extending along the length thereof for connecting the sensor means to a transmission line for transmitting the electrical signal to appropriate instrumentation, the conductor means including at least one conductor whose impedance varies along the length thereof so as to provide electrothermal matching of the transducer electrode sub-assembly to the dielectric object and the surrounding medium such that the transducer electrode sub-assembly acts neither as a heat source nor a heat sink with respect to the dielectric object during exposure of the dielectric object to microwave radiation.

In accordance with a preferred embodiment of the transmission line, an ultrathin thin film transmission line is provided whose thickness relative to the skin depth of the microwave fields is such that the conductor is poor medium for microwave conduction and thus is microwave decoupled. In addition, this ultrathin conductor prevents standing waves from forming at the interface between the transmission line and the transducer substrate. In a preferred embodiment, the thickness of the conductor is 10-4 (1/100 of 1%) of the skin depth at 3 GHz for the nichrome conductor employed.

The transducer electrode sub-assembly preferably comprises a cylindrical or tubular insulating substrate on which the conductor is mounted. The sensor device comprises a thermistor which is advantageously encapsulated in glass in order to provide an extremely stable microenvironment for the thermistor. The thermistor includes four terminals, and four thick film conductors are equally spaced about the circumference of the tubular substrate. The conductors are tapered to provide a relatively high resistance at the proximal end of the electrode sub-assembly and a relatively lower resistance at the distal end. The distal ends of the conductors are shorted together.

The transmission lines each preferably comprise an extremely thin metallic film, e.g., nichrome, disposed on an insulating substrate such as Mylar and include metallic pads at ends thereof for connecting the line into the system.

In an important application thereof, the invention enables high accuracy measurement of temperature during microwave exposure in order to estimate local energy deposition and physiological thermoregulatory responses for microwave hazards analysis. For example, the device of the invention can be used in medical applications to measure the temperature of a tumor during therapeutic microwave exposure or during microwave exposure used to accelerate the healing of a wound.

Other features and advantages of the invention will be set forth in, or apparent from, the detailed description of a preferred embodiment found hereinbelow.

DESCRIPTION OF THE PREFERRED EMBODIMENT

Figure 1:
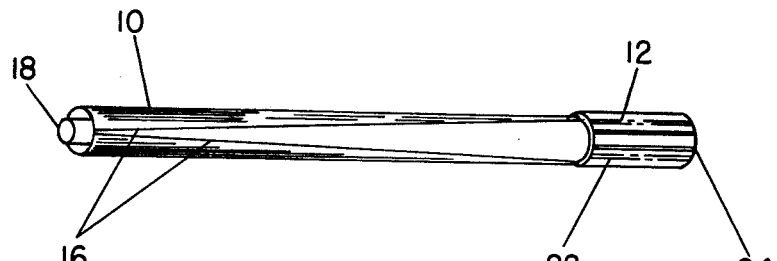
FIG. 1 is a perspective view of a thermometric transducer device constructed in accordance with a preferred embodiment of the invention.

Referring to FIG. 1, a preferred embodiment of the thermometric transducer system of the invention is illustrated. The system basically comprises a transducer sub-assembly 10 and a transmission line 12 for connecting the transducer sub-assembly to conventional measurement instrumentation, as illustrated. It is noted that this instrumentation can, for example, take the form described in the Larsen et al article referred to above and forms no part of the present invention.

Figure 2:
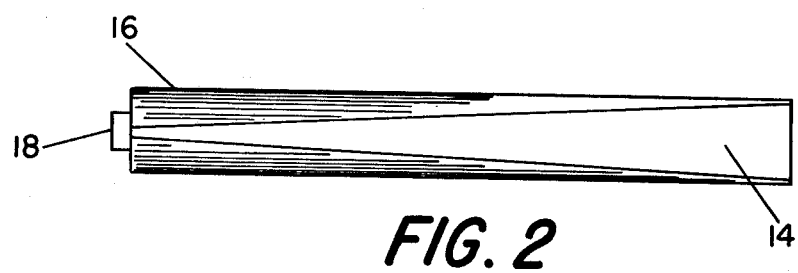
FIG. 2 is a perspective view, drawn to an enlarged scale, of the transducer electrode sub-assembly shown in FIG. 1, with the electrode inserted into human tissue.
Figure 3:
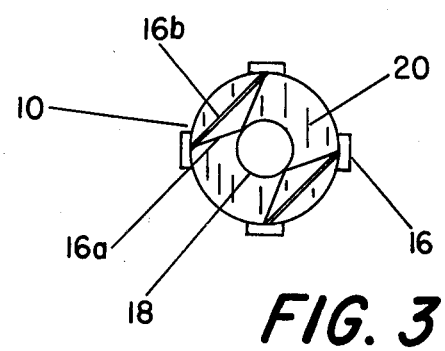
FIG. 3 is an end sectional view of the transducer electrode sub-assembly shown in FIG. 2.

The transducer sub-assembly 10 is illustrated in more detail in FIGS. 2 and 3 and, as shown, includes a hollow tubular insulating substrate 14 on which four tapered, thick film conductors 16 are located. A sensor in the form of four terminals, to a glass encapsulated thermistor 18 is located at the distal end of the transducer sub-assembly 10 and conductors 16 provide an electrical connection between the thermistor 18 and the transmission line 12. As can be best seen in FIG. 3, the four thick film conductors 16 are equally spaced about the circumference of tubular substrate 14 and, as discussed below, the thick film conductors 16 are tapered so to provide electrothermal matching, the conductors providing a relatively low impedance at the distal end of transducer 10 (which is shown as inserted into tissue) and a relatively high impedance at the proximal end adjacent to transmission line 12. As shown in FIG. 3, and as is also described in more detail hereinbelow, the conductors 16 are connected to the terminals of thermistor 18 by connections indicated diagrammatically at 16a, and two pairs of the conductors 16 are shorted together by connections indicated diagrammatically at 16b. Further, an encapsulating medium is indicated at 20 in FIG. 3.

Figure 4:
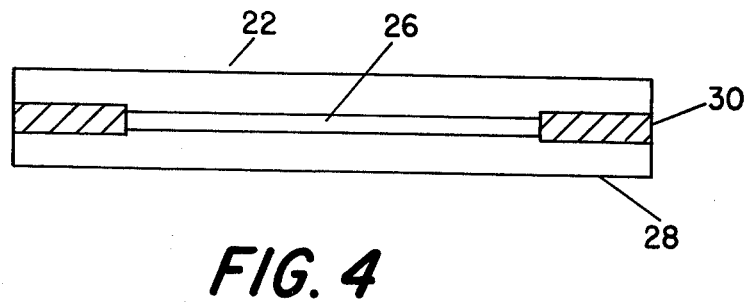
FIG. 4 is an exploded view of line 22 of the trassmission lines shown in FIG. 1.

Referring again to FIG. 2, the conductors 16 are connected to individual lines 22 of the transmission line 12 in a manner to be described hereinafter. Lines 22 are themselves enclosed in a protective tubing 24. A specific embodiment of one of the transmission lines 22 is shown in FIG. 4. Line 22 comprises an ultra-thin film conductor 26 mounted on a substrate 28. Conductive pads 30, used in connecting the thin film conductor 26 into the system, are provided at the ends of conductor 26, as illustrated.

The improved thermometric transducer system of the invention is preferably constructed by a method which combines thick film and thin film techniques, thick film techniques being used for the four terminal transducer sub-assembly 10, and thin film techniques being used for the transmission line 12.

Considering the invention in more detail, in an exemplary embodiment, the thick film construction of the transducer sub-assembly 10 begins with hollow cylindrical substrate 14 which, in a preferred embodiment, is fabricated of porcelain, is approximately 2 inches long, and has a 20 mil outer diameter and a 3 to 5 mil wall thickness. A gold ruthenium palladium (GRP) paste used for the thick film conductors 16 has a specific resistance of 50 ohms per square. The paste is applied over a screen with linearly tapering cross section in order to taper the linear resistance from approximately 200 Kohm per inch at the proximal portion of the transducer sub-assembly 10 to a value of approximately 50 Kohm per inch at the distal end, (these values being measured in approximately half inch segments from each end of the line). The gold portion of the paste provides the relatively "low" resistance component, and rethenium added to the paste aids in attachment to the substrate 14. Powered silicon added to the paste provides passivation when the composite is fired. The result is a glass passivated line which is virtually immune to scratching and degradation in physiological or hydrocarbon media.

The glass encapsulated thermistor 18 is attached after shorting the four conductors 16 into two pairs at the distal end of substrate 14 with minute amounts of conductive epoxy corresponding to connections 16b shown in FIG. 3. In this way, the conductors 16 are attached and the linear resistance verified without the presence of a temperature sensitive resistance. The thermistor sensor 18 (VECO 52A19) is conventionally supplied with two short stubs of 2 mil wire (PtIr) which were removed. The result is two "pads" (not shown) which are flush with the glass of the tubular substrate 14. These pads are used for connection to the shorted pairs of the thick film conductors 16, which is the last step in the fabrication of the mounting for thermistor 18.

Each thin film line 22 was fabricated by vacuum deposition of nichrome to form thin film conductor 26 on substrate 28, the latter being fabricated of 2 mil thick polished mylar. The vacuum deposition took place through a mask with a constant 10 mil width. Resistance should be monitored during the nichrome deposition as a means to reduce variability. The deposition was controlled to result in a thin film line having a lineal resistance of 200 Kohms per inch. Each line 22 is fabricated as a six inch strip. The width of conductor 26 is approximately 1 mil while the thickness of conductor 26 is approximately 30 Angstrom units (30A°) thick which, as noted, is approximately 10-4 of the skin depth of the conductor at 3 GHz. The ends of conductor 26 are then processed through a second deposition to produce pads 30, which, in the specific embodiment being discussed, are 1 mil thick pads of aluminum and extend over the terminal 0.200 inch of the nichrome conductor 26. A final deposition provides a uniform $SiO_2$ passivation.

The four finished lines 22 are attached to at their distal ends (the proximal end of the transducer subassembly 10) by minute amounts of conductive epoxy. All junctions are strain relieved with clear nonconductive epoxy. Because of problems with minute fractures in the thin film at the region near the Al pads 30, presumably caused by different coefficients of expansion for the thick Al and the tin nichrome, room temperature setting epoxies are used.

The four thin film lines 22 are covered in Tygon tubing of 40 mil ID and 60 mil OD, and corresponding to tubing 24 of FIG. 2. The proximal ends of the four thin film lines 22 are then attached to a 4-pin connector (not shown) with an intermediate piece of substrate (not shown) and point-to-point 1 mil gold wire. The entire interior of the connector shell (not shown) and the tubing 24 are then potted and strained relieved with nonconductive epoxy.

In prior testing of the devices, power densities were always 246 $mW/cm^2$ incident, and the duration varied between 8 and 30 sec. in most cases. Short exposures are necessary in order to reduce thermal diffusion. The methods for field perturbation testing were essentially the same before-and-after design as described in the Larsen et al article. In brief, a 3 cm sphere of brain tissue phantom was exposed to far field 2450 MHz at a predetermined power density and exposure duration, after which thermographic scans mapped the thermal analog of the induced field distribution. The electrode was then inserted, either after cooling of the original target, or in another identical target, and the exposure regimen was repeated with thermographic scans. To the extent that the electrode affected field induction in the brain phantom, the two heating patterns would be different.

Thermographic testing of the thin film line 12 took place in air. Short segments (2 inches) were used with thermographic line scans at the center of the line segment. This arrangement obviated the need for two dimensional scans to find the location of peaks in the standing wave pattern. It is noted that the latter is a very difficult procedure for quantitative testing due to the rapid dissipation of heat which gives erroneously low values because of the 4 second frame time for high resolution two dimensional imagery. The short segments could be analyzed by a single line scan in the geometric center of the line segment. Under these conditions, the line segment was a short dipole in which a triangular current distribution would produce peak heating in the geometric center. Standing waves are detectable in the two dimensional scans in the phantom since all of these scans involved complete electrodes including the connector and shell referred to above.

The transducer electrode 10 was located in a brain phantom, at a distance of 10 mm from the leading edge of the sphere, and at a depth such that the 200 Kohm per inch thick film conductor 16 was operated in air with 5 mm of exposed length beyond the brain. The thin film line 12, of course, operated totally in air.

It is noted that the thermometric evaluation of the electrodes necessitated, and resulted in, the development of a temperature encoding electronic package. This package (which is not illustrated) consists of an IC constant current generator operating at 7Hz to drive the thermistor 18 with 100 microamps over one unshorted pair of lines. A voltage detector is provided which comprises two high input impedence ($10^9$ ohms) buffers followed by an IC instrumentation amplifier buffer with a high common mode rejection ratio (90 dB) and a frequency shaped gain provided by a feedback network. The lines for voltage detection are, of course, the remaining unshorted pair of lines. The output voltage is measured by a Hewlett Packard 3340A Digital Multi-Meter (DMM). Chart records were made on a Hewlett Packard 7100B after processing by a Hewlett Packard 580A digital-to-analog converter (DAC). The system was tested in a Leeds & Northrup 8401 oil bath with better than millidegree regulation. The bath temperature was monitored with a Hewlett Packard 2801A quartz thermometer. The electrode was first tested for stability over a four day period. After this the bath was slewed over a temperature range of 35° to 40° C. over an eight hour period for RT calibration and hysteresis testing. This procedure was repeated four times over a seven day period.

Considering the results of the tests, the thermographic evaluation of the electrode of the invention showed that thermal analogs of field aberrations could be either in the direction of heat sourcing or in the direction of heat sinking. As a result, the concept of electrothermal matching places an upper limit on electrode decoupling to the extent that the thermal conductivity of the electrode allows heat sinking.

Conversely, an inadequately decoupled electrode may serve as a heat source as described above where heating due to the line may be seen to diffuse down the substrate into the brain phantom.

As noted above, the vastly different loss of air and brain is reconciled in accordance with the invention by linearly tapering the thick film conductors 16 from the highest value at the proximal end of the substrate 14 which operates in air to the distal end which is to be embedded in the brain. The results with this configuration indicates only a slight heat sinking is detectable in the line scan, and no heat sourcing is evident.

Line scans through the thin film conductors 22 in air have been compared to similar scans through PTFE conductors of the same width. Width matching appears to be necessary in order that the effects of the modulation transfer function of the infrared imaging system are constant. Although standing waves were detectable with wide transmission lines (i.e. for widths of about 100 mil), such standing waves could not be detected with the 10 mil line, in contrast with PTFE lines as discussed above.

A thermometric evaulation disclosed environmental temperature sensitivity in the temperature encoding electronics such that a 1° C. change in room temperature produced a 20 millidegree apparent change in the measurand, and of the opposite direction. Stability tests in temperature controlled conditions established the resolution of the system to be determined by a noise equivalent temperature of about 7 millidegrees. Long term stability proved to be largely determined by variations in room temperature. Over a single 8 hour hyteresis test, the ascending and descending voltage-temperature (VT) curves were largely superimposed except for a 10 millidegree discrepancy at the end of the run. On two successive days, the VT curves tracked within 25 millidegrees.

Although the invention has been described relative to an exemplary embodiment thereof, it will be understood that other variations and modifications can be effected in this embodiment without departing from the scope and spirit of the invention.

We claim:

1. A thermoelectric transducer device for measuring the temperature of a dielectric exposed to microwave radiation during such exposure, said device including a transducer electrode sub-assembly comprising an elongate substrate, a sensor means, mounted at one end of the substrate, for sensing the temperature of the dielectric object and converting the temperature sensed into an electrical signal in accordance therewith, and conductor means extending along the length of said substrate for connecting the sensor means to a transmission line for transmitting the said electrical signal for processing by measurement instrumentation, said conductor means comprising at least four conductors whose impedance varies along the length thereof so as to provide electrothermal matching of the transducer electrode sub-assembly to the dielectric object so that the transducer electrode sub-assembly acts neither as a heat source nor a heat sink with respect to the dielectric object during the exposure of the dielectric object to microwave radiation.

2. A device as claimed in claim 1 wherein said substrate comprises an insulating hollow tube and said conductor comprises a thick film conductor, deposited thereon.

3. A device as claimed in claim 1 wherein said conductor comprises a thick film conductor which is tapered along the length thereof between said sensor means and said transmission line so as to provide a relatively low impedance at the end thereof adjacent to said sensor means and a relatively high impedance at the end thereof adjacent to said transmission line.

4. A device as claimed in claim 1 wherein said sensor means comprises a thermistor.

5. A device as claimed in claim 4 wherein said thermistor is encapsulated in an insulating material.

6. A device as claimed in claim 4 wherein said substrate comprises a hollow ceramic tube and said conductor means comprises four said conductors disposed in equally spaced relationship about the circumference of said tube.

7. A device as claimed in claim 1 wherein said device includes a transmission line comprising a thin metallic film conductor mounted on a substrate.

8. A device as claimed in claim 7 wherein said conductor has a thickness which is such a small fraction of the skin depth of microwave field that the conductor is effectively microwave decoupled.

9. A device as claimed in claim 8 wherein said film comprises a nichrome film deposited on a substrate and the thickness of said film is no greater than 30Å.

10. A thermometric transducer device for measuring the temperature of a dielectric exposed to microwave radiation during said exposure, said device comprising a transducer electrode sub-assembly including an elongate substrate having distal and proximal ends, a sensor means, mounted at the distal end of said substrate, for sensing the heat energy of the dielectric object and converting the sensed energy into a corresponding electrical signal and conductor means, comprising a plurality of thick film conductors, extending along the length of said substrate, for coupling said signal to the proximal end of said substrate, and transmission line means, connected to said thick film conductors at the proximal end of said substrate, for coupling said signal to measurement instrumentation, said transmission line means comprising a plurality of thin film metallic conductors, the thickness of each said conductor as compared with the skin depth of the microwave radiation in said conductors being of such a small value that the thin film metallic conductors provide a poor medium for microwave conduction and hence are microwave decoupled.

11. A device as claimed in claim 10 wherein the thickness of said conductors is no greater than 30Å.

12. A device as claimed in claim 11 wherein said conductors comprise nichrome films deposited on an insulating substrate.

* * * * *